United States Patent [19]

Stuerzel

[11] Patent Number: 5,536,356

[45] Date of Patent: Jul. 16, 1996

[54] APPARATUS AND METHOD FOR FABRICATING BREATHER BAGS

[75] Inventor: John F. Stuerzel, Freeport, N.Y.

[73] Assignee: Clean Room Products, Inc., Ronkonkoma, N.Y.

[21] Appl. No.: 226,480

[22] Filed: Apr. 12, 1994

[51] Int. Cl.$^6$ ............................................... B30B 5/04
[52] U.S. Cl. ........................ 156/514; 156/519; 156/554; 156/555; 156/583.5; 493/197; 493/202
[58] Field of Search .................... 128/205.13, 205.17, 128/205.27, 205.28, 205.29; 156/555, 583.1, 583.5, 290, 553, 554, 510, 513, 514, 516, 517, 519; 493/197, 202

[56] References Cited

U.S. PATENT DOCUMENTS

| | | | |
|---|---|---|---|
| 2,742,080 | 4/1956 | Cloud | 493/202 X |
| 2,784,763 | 3/1957 | Shorts | 156/554 |
| 3,332,324 | 7/1967 | Lehmacher et al. | 493/197 |
| 4,085,560 | 4/1978 | McClosky | 156/554 |
| 4,670,080 | 6/1987 | Schwartz et al. | 156/307.5 |
| 4,997,507 | 3/1991 | Meyer | 156/286 |
| 5,149,393 | 9/1992 | Hutchinson et al. | 156/555 |

*Primary Examiner*—David A. Simmons
*Assistant Examiner*—J. Sells
*Attorney, Agent, or Firm*—Dilworth & Barrese

[57] ABSTRACT

An automated continuous heat sealing apparatus and method are disclosed having dedicated operating stations for fabricating continuous hermetically sealed tubular structures and individual bags from rolls of continuous webs of polymer material, the first web including TYVEK®, as breather bags adapted for gas and steam sterilization. The breather bags are customized to any length depending on the settings of the apparatus. A feeding station holding the rolls of continuous webs longitudinally feeds the continuous webs to a first operating station having a slitter for providing a continuous longitudinal strip of apertures in the second continuous web for cutting material from the slitted second continuous web, and for continuously heat sealing a first set of seams to join the first and second webs. A second operating station continuously heat seals a second set of seams to join the second and third continuous webs for forming a continuous tubular structure. An optional third station intermittently heat seals transverse seams at predetermined lengths along the longitudinal length of the continuous tubular structure, and an optional fourth operating station cuts the continuous tubular structure a predetermined distance from the transverse seams to form individual breather bags.

15 Claims, 11 Drawing Sheets

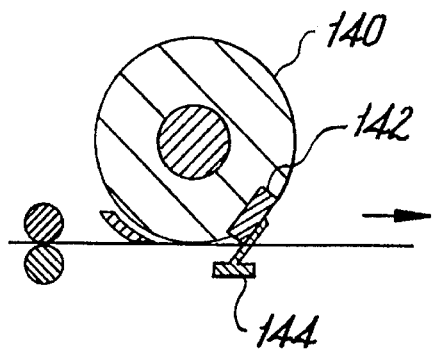
Fig. 13
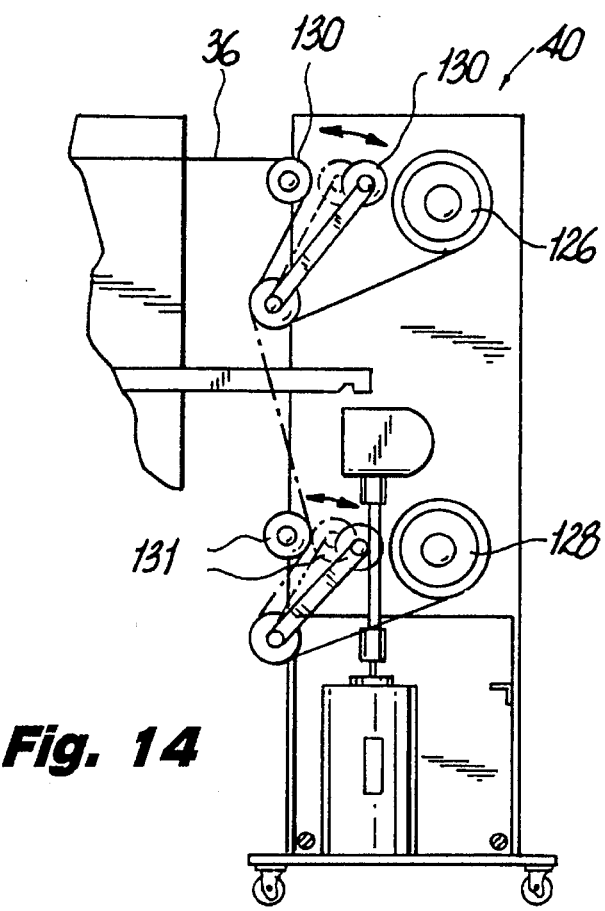
Fig. 14
Fig. 15
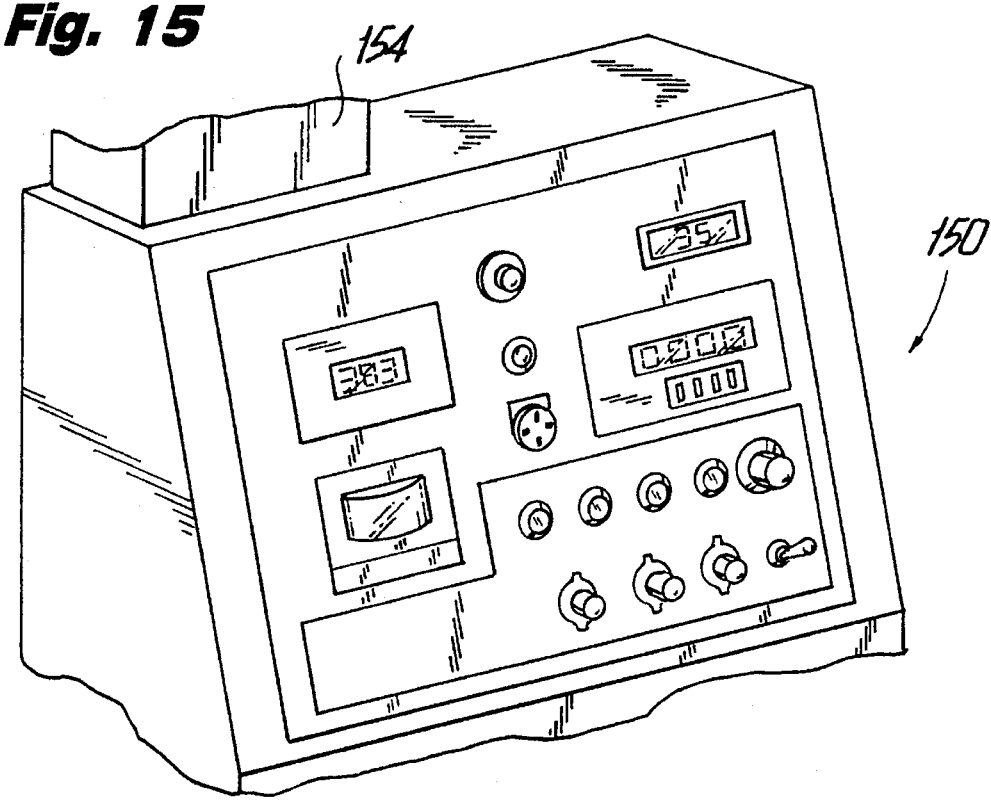

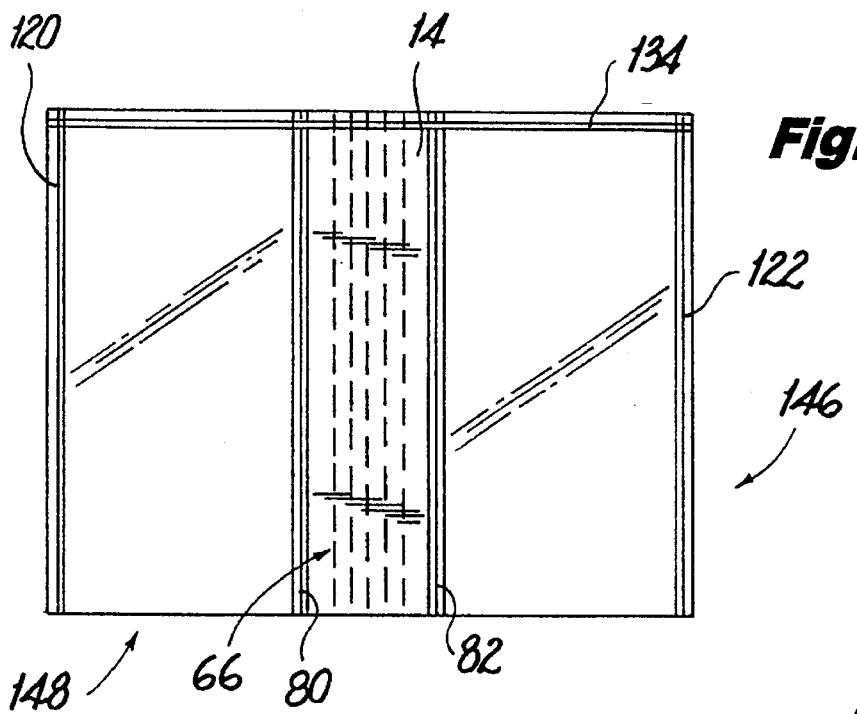
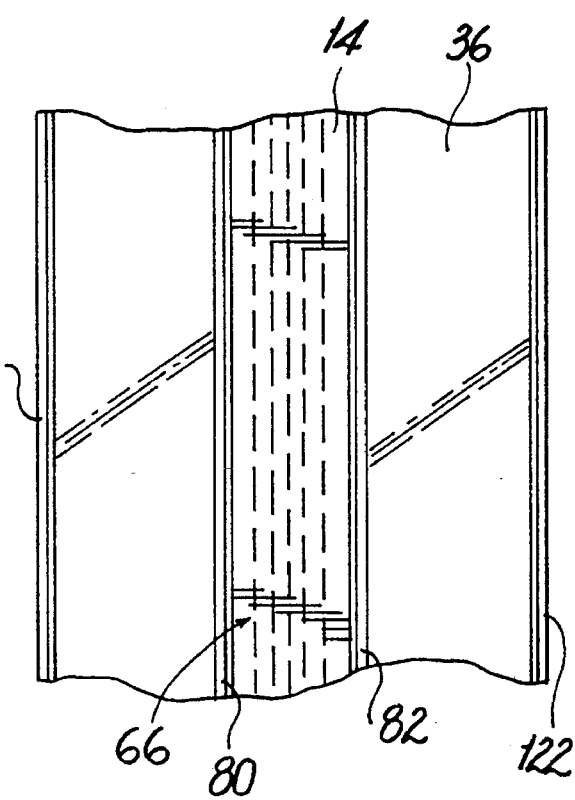
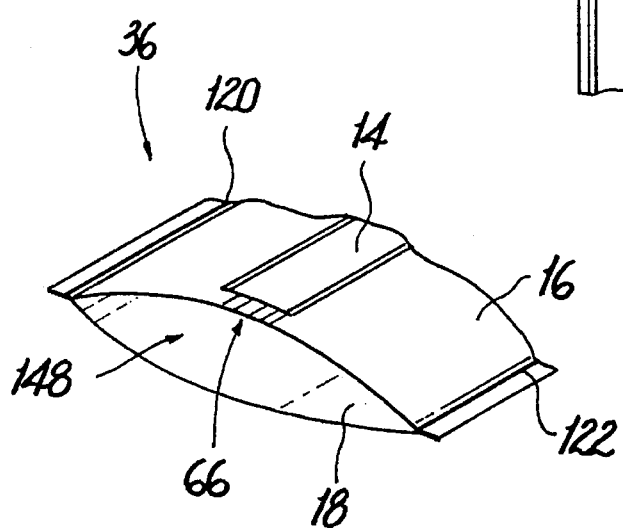

APPARATUS AND METHOD FOR FABRICATING BREATHER BAGS

BACKGROUND OF THE INVENTION

1. Field of the Invention

The present invention relates to automated sealing apparatus and methods for fabricating containers adapted for sterilization. More particularly, this invention is directed to an automated apparatus for continuously heat sealing portions of moving polymer webs to form bags or tubes.

2. Description of Related Art

Packages or bags formed from gas pervious materials adapted for gas sterilization of products contained therein are known in the art. Fibrous polymer webs such as spunbonded polyolefins and, particularly, a type of polyethylene known as TYVEK® 1059B, available from DuPont, are useful for gas and steam sterilization. Such spun-bonded polyolefins are pervious to sterilizing gases such as ethylene oxide, steam, or dry heat, while being impervious to bacteria and other contaminants.

In the packaging of surgical instruments, pharmaceutical products, and other sterile objects, sharp points or surfaces of the packaged objects may come in contact with and abrade the TYVEK® 1059B due to movement of the objects within the package during shipping or handling of the packaged product. It is advantageous to construct such gas pervious containers or breather bags from a combination of TYVEK® 1059B and other polymer webs such as polypropylene based materials which are resistant to abrasion by sharp points. It is also advantageous to construct breather bags formed from such polypropylene based materials having slits or perforations adjacent TYVEK® 1059B and lying between the TYVEK® 1059B and the packaged objects to prevent abrasion of the TYVEK® 1059B, while the slits provide access to sterilizing gas through the TYVEK® 1059B to sterilize the packaged objects.

Since TYVEK® 1059B is an opaque material, transparent polypropylene based materials in conjunction with TYVEK® 1059B are also particularly useful in constructing transparent breather bags for viewing and inspecting the contents of the package. Breather bags formed from TYVEK® 1059B and polypropylene based materials have previously been manufactured by step and seal apparatus. These step and seal apparatus intermittently move sheets of polymer materials including TYVEK® 1059B and polypropylene based materials to a staging area in incremental steps, stopping the materials at the staging area, and applying a heat sealing mechanism. Typically a heated stamp or impulse seal is used for applying heat and pressure to the materials to be heat sealed. Thereafter, the heat sealed materials are cut into individual bags while incrementally moving another set of sheets of polymer materials for heat sealing by the heated stamp.

In use, the step and seal apparatus has a typical output of 5 to 8 breather bags per minute, with the steps of stopping and sealing the polymer materials being the slowest step in production.

Continuous material sealing apparatus are known in the art. However, heretofore there has been no application of the novel features of the present invention described herein to implement continuous heat sealing of continuously fed webs of continuous polymer material, including TYVEK® 1059B, to form a continuous hermetically sealed tubular structure adapted for gas and steam sterilization, with the apparatus capable of producing 25 to 30 breather bags per minute.

The present invention increases breather bag production by implementing a continuous feeding and sealing of polymer materials, i.e. the relatively slow step and seal approach of previous breather bag machines is eliminated.

SUMMARY OF THE INVENTION

Automated sealing apparatus is disclosed for continuously heat sealing continuous webs of polymer material to form a hermetically sealed continuous tubular structure adapted for gas and steam sterilization and having proximal and distal ends. The automated sealing apparatus includes a first continuous web of polymer material mounted to a frame, the first continuous web being substantially pervious to sterilizing gas; a second continuous web of polymer material mounted to the frame; a third continuous web of polymer material mounted to the frame; means for approximating and continuously moving the continuous webs of polymer material simultaneously in a longitudinal direction; a first operating station for continuously receiving the first and second continuous webs of polymer material and for continuously heat sealing a first plurality of continuous parallel longitudinal seams to join the first continuous web of polymer material to the second continuous web of polymer material as each of the first and second continuous webs continuously passes through the first operating station; and a second operating station for receiving the joined first and second continuous webs of polymer material and for continuously heat sealing a second plurality of continuous parallel longitudinal seams parallel to the first plurality of longitudinal seams to join the second and third continuous webs of polymer material as each of the second and third continuous webs continuously passes through the second operating station to form the hermetically sealed continuous tubular structure open at its proximal and distal ends.

Means are included for continuously processing the second continuous web of polymer material to provide access therethrough in a predetermined area positioned adjacent the first continuous web of polymer material. Such means may include a slitting station for continuously slitting the second continuous web to form a plurality of apertures as a foraminous longitudinal strip.

An optional third operating station continuously heat seals the tubular structure transversely with respect to the longitudinal direction to generate a transverse hermetically sealed seam at predetermined seam positions along the longitudinal length of the tubular structure.

A fourth operating station is also optionally included for continuously cutting the tubular structure transversely with respect to the longitudinal direction at cutting positions spaced a predetermined distance from the predetermined seam positions to generate an individual container having an open distal end and a closed proximal end from the tubular structure.

A process is also disclosed for forming a hermetically sealed continuous tubular structure from continuous webs of polymer material for gas and steam sterilization of a product contained therein. The process includes the steps of: providing a first, second, and third continuous web of polymer material mounted on a frame, the first continuous web being substantially pervious to sterilizing gas; continuously moving the continuous webs of polymer material simultaneously in a longitudinal direction; continuously heat sealing the first continuous web of polymer material to the second continuous web of polymer material to join the first continuous web of polymer material to said second continuous web of polymer material; and continuously heat sealing the second continuous web of polymer material to the third continuous web of polymer material to join the second and third continuous webs of polymer material to form the hermetically sealed continuous tubular structure open at its proximal and distal ends.

The process may further include the step of continuously processing the second web of polymer material to provide access therethrough in a predetermined area positioned adjacent the first continuous web of polymer material.

The process of the present invention may optionally include the step of continuously heat sealing the hermetically sealed continuous tubular structure transversely with respect to the longitudinal direction to generate a transverse hermetically sealed seam at predetermined seam positions along the longitudinal length of the hermetically sealed continuous tubular structure; and also the step of continuously cutting the hermetically sealed continuous tubular structure transversely with respect to the longitudinal direction at cutting positions spaced a predetermined distance from said predetermined seam positions to generate an individual container having an open distal end and a closed proximal end from the hermetically sealed continuous tubular structure.

BRIEF DESCRIPTION OF THE DRAWINGS

The features of the present invention will become more readily apparent and may be better understood by referring to the following detailed description of an illustrative embodiment of the present invention, taken in conjunction with the accompanying drawings, where:

FIG. 13 is a side cross sectional view of the fourth operating station shown in FIG. 12.

FIG. 14 is a side cross sectional view of the collecting station of FIG. 8.

FIG. 15 is an enlarged frontal view of control panels of the apparatus.

FIG. 16 illustrates a breather bag constructed by the apparatus and method of the present invention.

FIG. 17 illustrates a portion of a continuous hermetically sealed tubular structure constructed by the apparatus and method of the present invention.

FIG. 18 is a perspective view of an open end of the hermetically sealed tubular structure of the present invention.

DETAILED DESCRIPTION OF THE PREFERRED EMBODIMENTS

Figure 1:
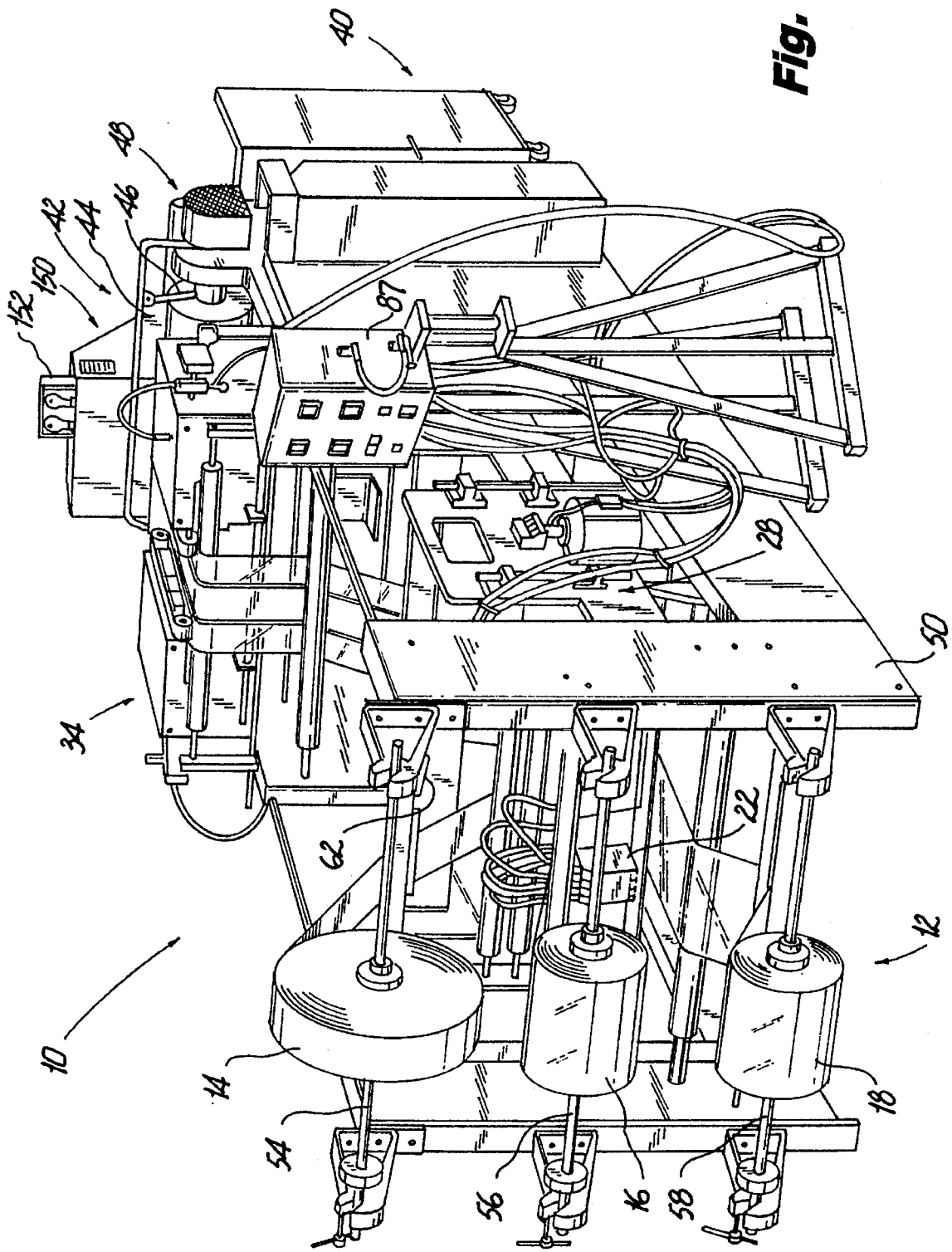
FIG. 1 is a perspective view of the automated sealing apparatus of the present invention.
Figure 1A:
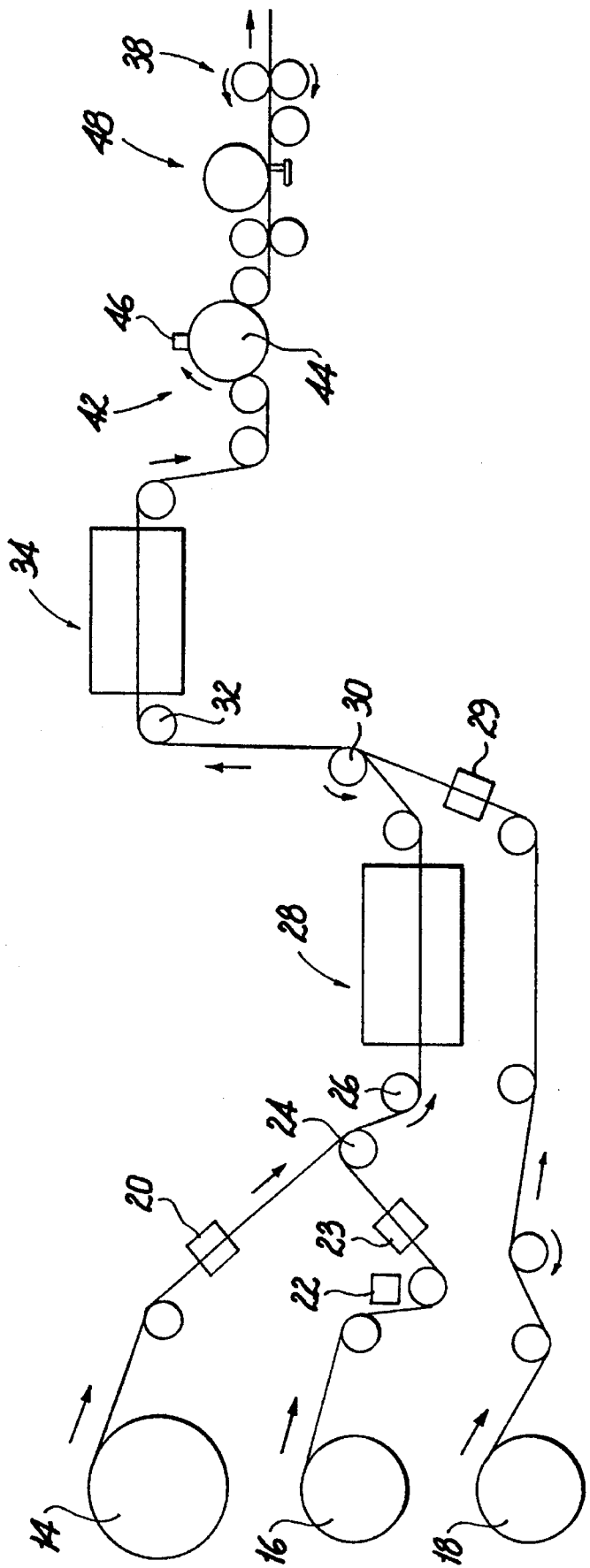
FIG. 1A is a lateral schematic view of the present invention.

Referring now in specific detail to the drawings, with like reference numerals identifying similar or identical elements, the present invention comprises an apparatus, generally designated 10, for heat sealing continuous seams to join continuous webs and includes a plurality of operating stations, as shown in FIGS. 1–1A, each dedicated to perform specific functions to continuously construct continuous hermetically sealed tubular structures adapted for gas and steam sterilization and capable of being cut into breather bags of customized or predetermined lengths. FIG. 1 is a perspective view of the apparatus, and FIG. 1A is a schematic representation of the apparatus with corresponding component parts positioned to process the continuous webs through the apparatus to continuously form the continuous hermetically sealed tubular structures. It is contemplated herein that sterilizing gas includes ethylene oxide, steam, or the like, which may be used individually or in combination with other sterilizing gases, sterilizing agents, and/or other sterilization techniques.

Generally, as shown in FIG. 1A, a feeding station 12 holds rolls of continuous webs 14, 16, 18 of polymer material at a proximal portion of the apparatus 10. Each of the continuous rolls 14, 16, 18 are fed and processed longitudinally toward the distal end of the apparatus 10. The first continuous web 14 passes a vacuum device 20 having a tube which removes particulates and/or contaminants therefrom and a first static bar 21 for reducing or eliminating static therefrom. The second continuous web 16 is processed by a slitter 22 to provide access therethrough in a predetermined area along the longitudinal length of the second continuous web 16, and a second static bar 23 is used for reducing or eliminating static from the slitted second continuous web 16. The first and second continuous webs 14, 16 are then brought adjacent each other by rollers 24, 26 to pass through a first operating station 28 to be joined by heat sealed seams. The third continuous web 18 passes the first operating station 28 unchanged and passes a third static bar 29 for reducing or eliminating static therefrom.

Referring further to FIG. 1A, the joined first and second continuous webs 14, 16 are brought adjacent to third continuous web 18 by rollers 30, 32 to be processed by a second operating station 34 to be joined by heat sealed seams to form a continuous hermetically sealed tubular structure 36, fed by rollers 38, for collection by a collecting station 40 or pickup station (not shown in FIG. 1A). The collecting station 40 is described in further detail below in conjunction with FIGS. 8 and 14.

An optional third operating station 42 processes the continuous hermetically sealed tubular structure 36 by passing the tubular structure 36 over a platen 44 to be transversely heat sealed by a transverse heating bar 46 at predetermined positions along the longitudinal length of the tubular structure 36. An optional fourth operating station 48 continuously cuts the tubular structure 36 in predetermined locations to form individual hermetically sealed breather bags.

Referring to FIG. 1 with corresponding reference to FIG. 1A, the feeding station 12 is shown having a frame 50 to which at least three continuous webs 14, 16, 18 of polymer material are mounted on an unwind stand with rolling bars 54, 56, 58 for continuous feeding to the first operating station 28 as described below. The roller assembly is a model 225 apparatus available from Ro-An of Middle Village, Queens, N.Y.

Figure 2:
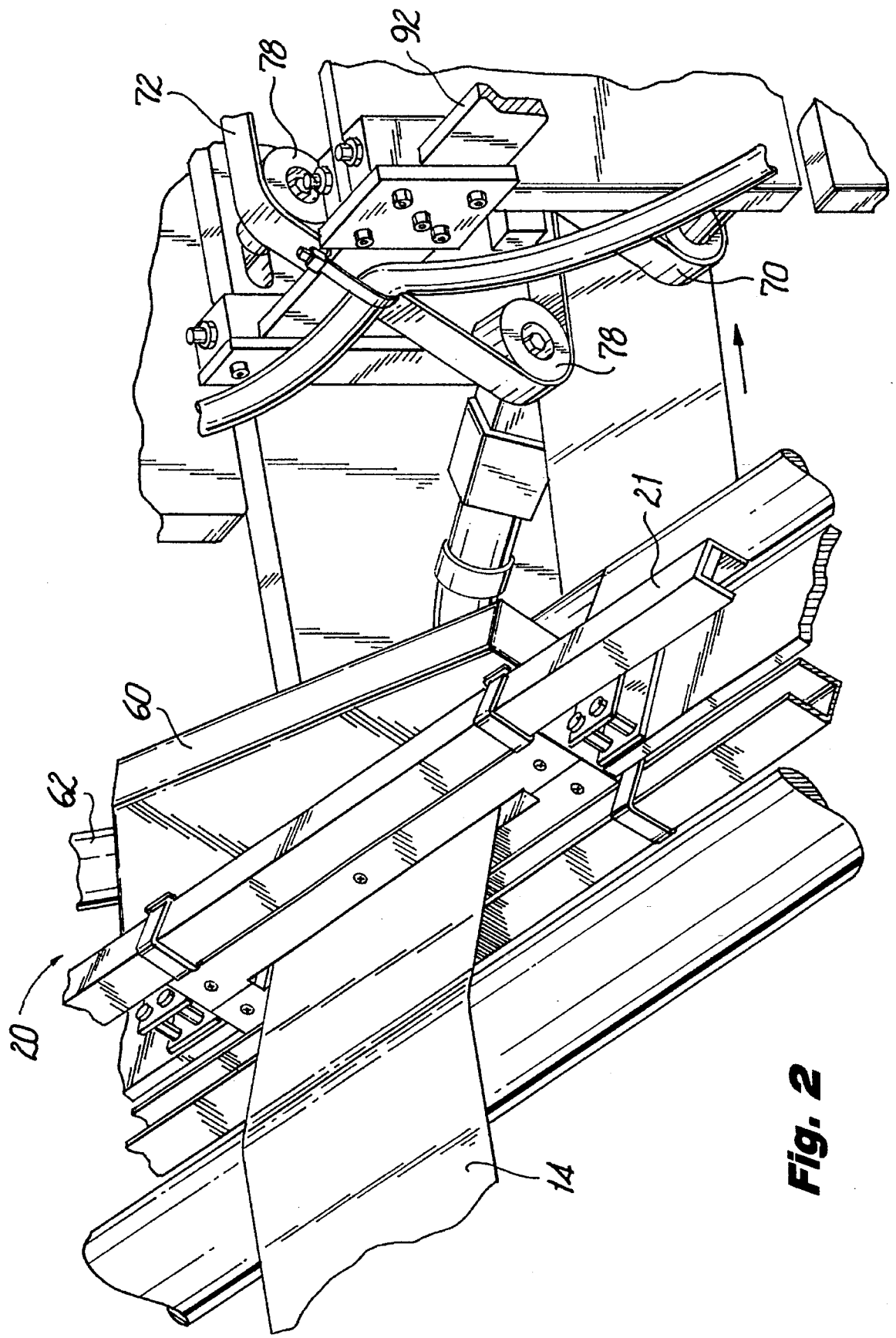
FIG. 2 is a top perspective view of a cleaning mechanism used in the present invention.

The first continuous web 14 is shown as a continuous roll of medical grade TYVEK® 1059B, available from DuPont, which is an opaque fibrous spun bonded polyolefin, preferably polyethylene, pervious to sterilizing gas such as ethylene oxide or steam but impervious to bacteria and other contaminants. TYVEK® 1059B is an FDA approved material used for breathable pouches. As shown in FIG. 2, the first continuous web 14 passes a first static bar 21 and then passes a vacuum cleaning mechanism 20 in the first operating station, preferably a vacuum device 60 having tube 62 connected to a vacuum source (not shown) for removing particulates and/or contaminants from the first continuous web 14.

Each of the second and third continuous webs 16, 18 of polymer material are 3 mil rolls of polypropylene based polymer materials, preferably a RP blend copolymer of polypropylene and polyethylene with polyethylene of a sufficient amount to allow the first continuous web 14 of TYVEK® 1059B and the second continuous web 16 to be heat sealed as described below while simultaneously meeting FDA and pharmaceutical standards.

Figure 3:
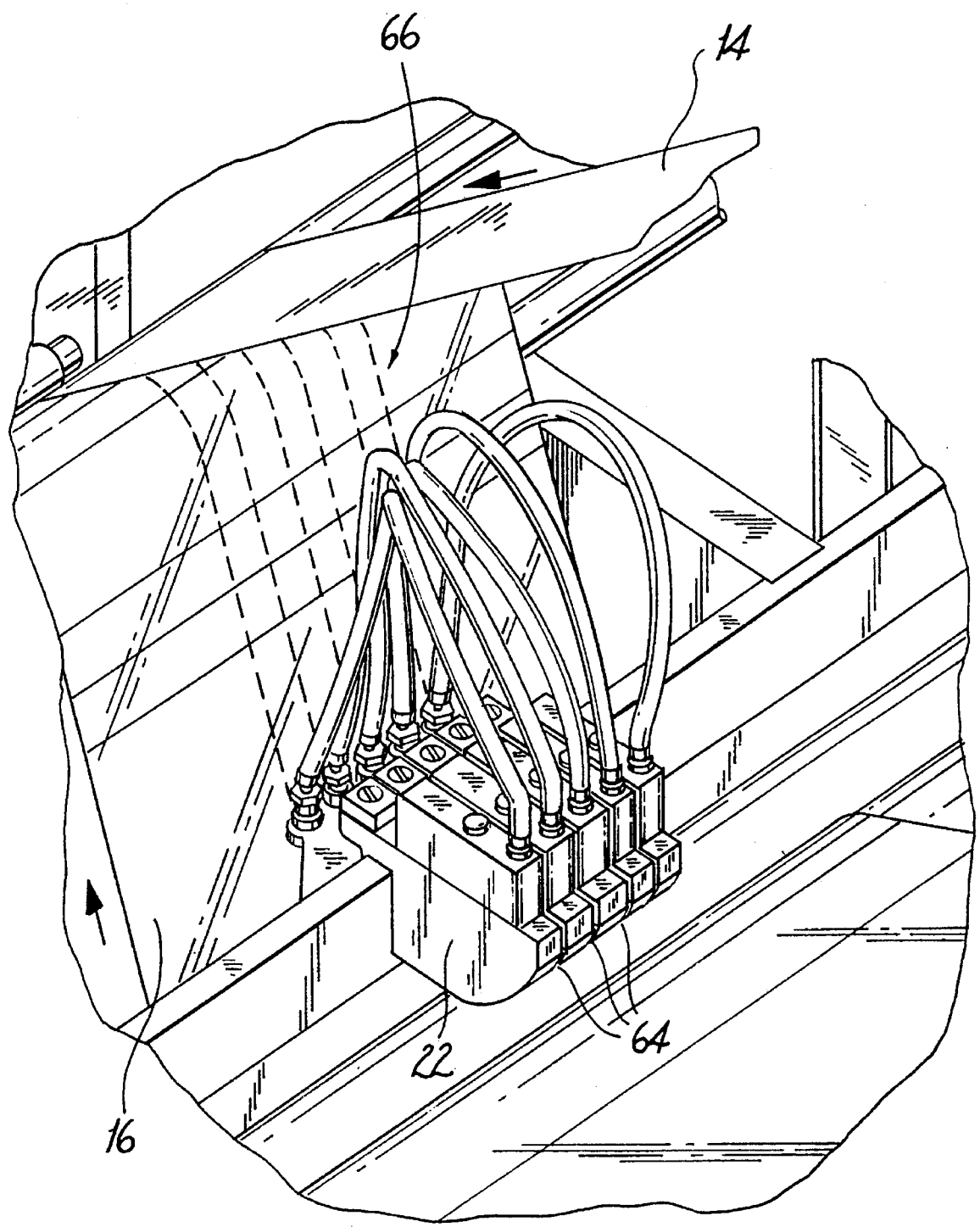
FIG. 3 is a top perspective view of a slitter for providing openings in a web of polypropylene material.

As shown in FIGS. 1–1A and 3, the second continuous web 16 is continuously fed to the first operating station 28 to pass means for providing access through the second continuous web 16. In this case, this means includes the pneumatically operated slitter 22 (shown in FIG. 3), including rotating cutting members 64 for continuously slitting a plurality of longitudinal slits 66 or apertures as a foraminous longitudinal strip in the second continuous web 16. A second static bar 23 removes static from the slitted second continuous web.

Figure 4:
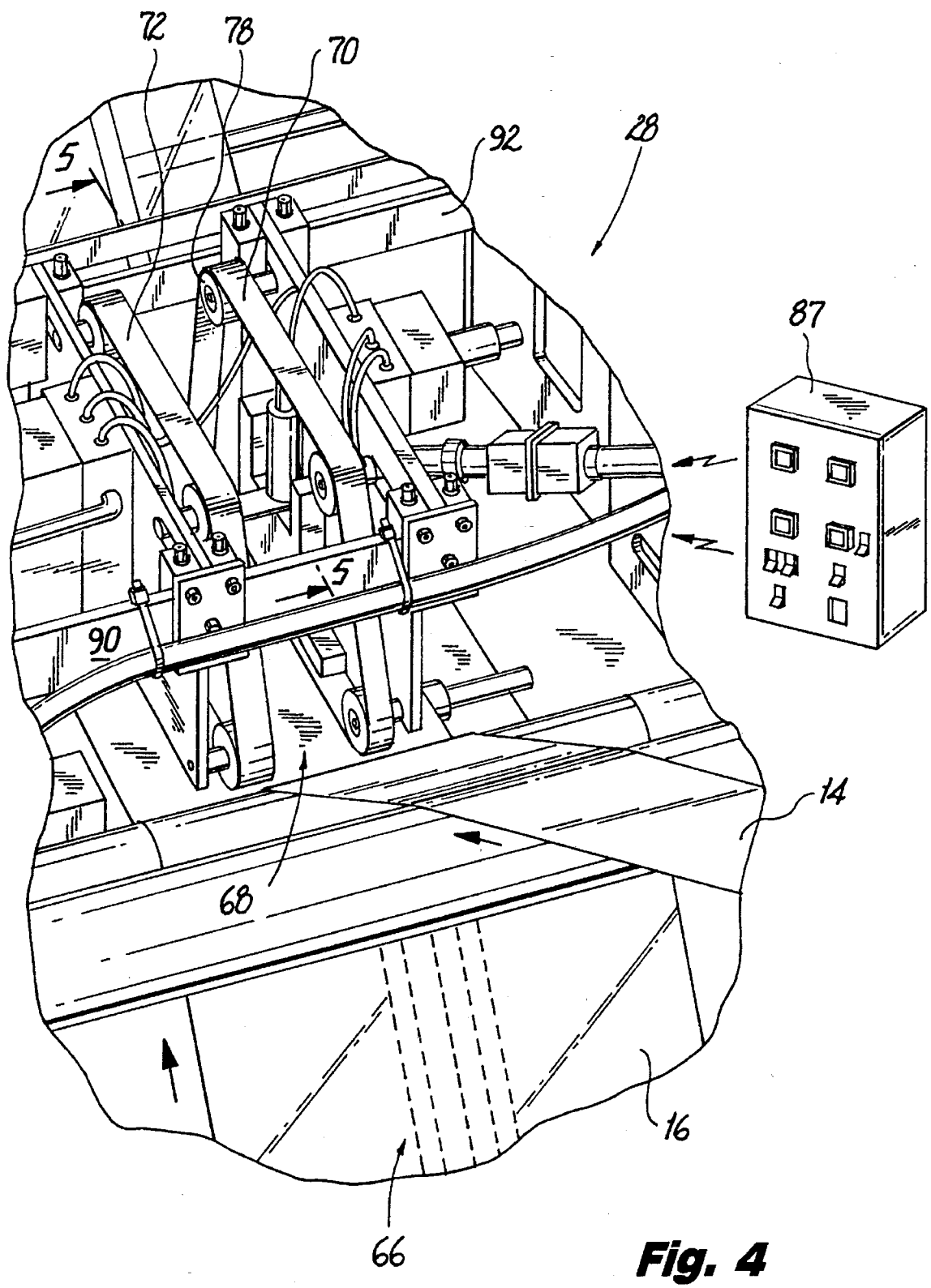
FIG. 4 is a top perspective view of the first continuous heating sealing operating station.

As shown in FIG. 4, the first and second continuous webs 14, 16 are brought adjacent each other such that a substantial portion of the first continuous web 14; i.e. the TYVEK® 1059B, overlaps the longitudinal strip of slits 66 of the second continuous web 16. The first and second continuous webs 14, 16 are thus positioned adjacent each other as both the first and second continuous webs 14, 16 are continuously fed through a first heating section 68 of the first operating station 28. In final package form, the slitted second continuous web 16 prevents packaged products from contacting and abrading the inner surface of the first continuous web 14 of TYVEK® 1059B while the slits 66 permit sterilizing gases passed through the TYVEK® 1059B to permeate to the product.

Figure 5A:
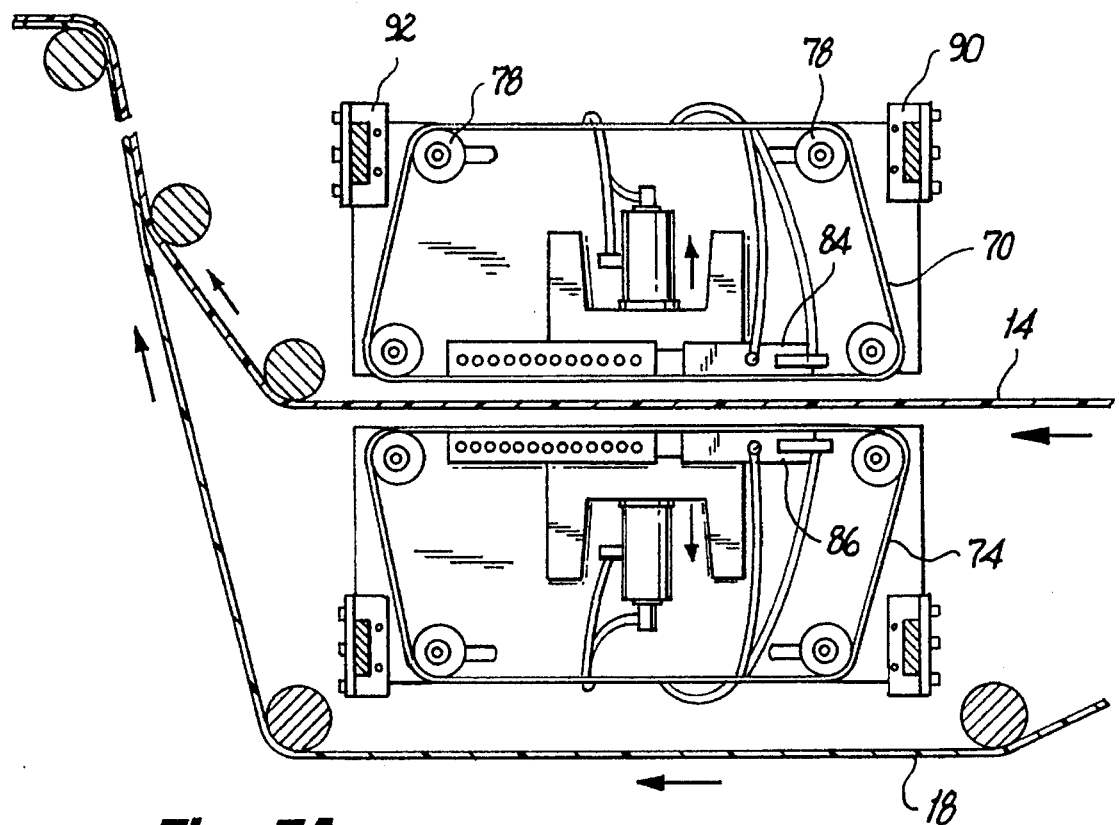
FIG. 5A is an alternative configuration of the first operating station in FIG. 5.
Figure 5:
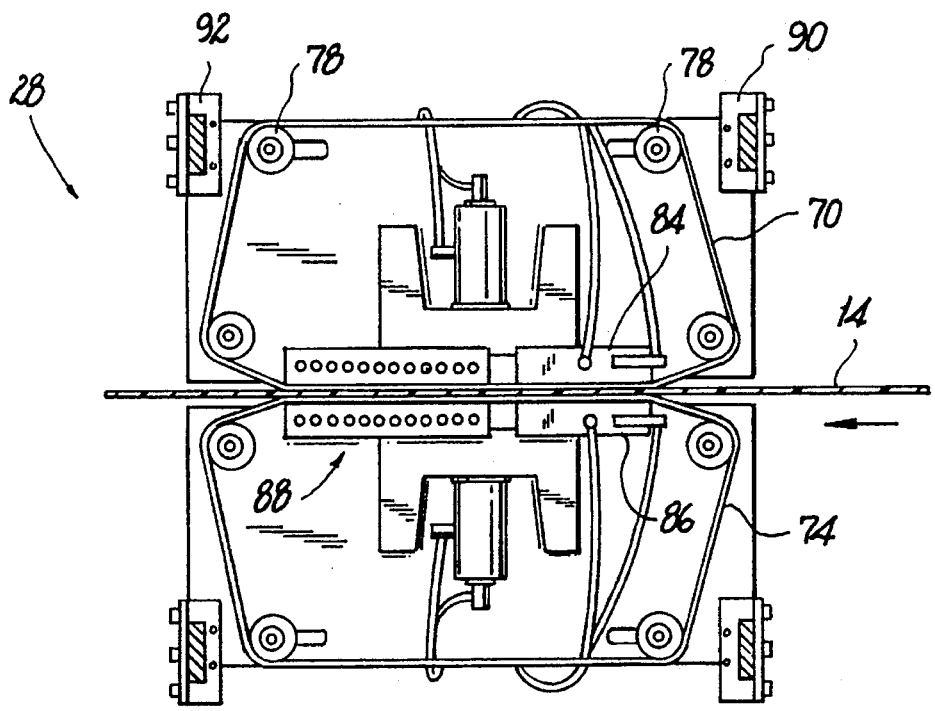
FIG. 5 is an enlarged side cross sectional view taken along the center of a first operating station.

Referring in greater detail to FIG. 5 in conjunction with FIG. 4, the first heating section 68 includes a first upper pair 70, 72 and a first lower pair 74, 76 of anti-adhesive heat conductive bands continuously driven by rollers 78 or rolling wheels for horizontally moving and applying pressure to the adjacent first and second continuous webs 14, 16 therebetween. A respective one of the first upper pair 70, 72 and a respective one of the first lower pair 74, 76 of heat conductive bands flank each side of the first continuous web 14 of TYVEK® 1059B and also flank the longitudinal strip of slits 66 by the positioning of the first continuous web 14 overlapping the longitudinal strip of slits 66.

Figure 6:
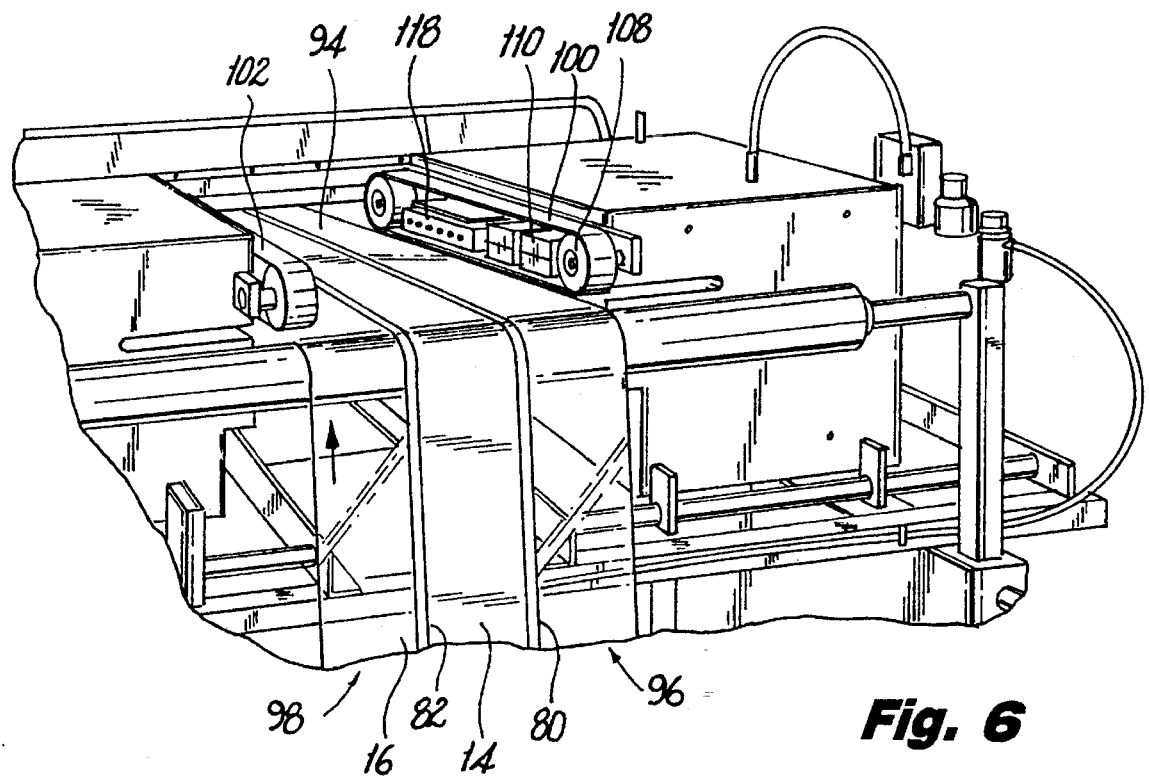
FIG. 6 is a perspective of a second continuous heat sealing operating station.

The first upper and lower pairs 70–76 of heat conductive bands are composed of fiberglass coated with polytetrafluoroethylene, also known as TEFLON® available from DuPont, as an anti-adhesive coating to prevent the first and second continuous webs 14, 16 from adhering to the first upper and lower heat conductive bands 70–76 as pressure is applied by the heat conductive bands 70–76. Referring to FIG. 5 in conjunction with FIG. 6, a first plurality of continuous longitudinal seams 80, 82, shown in FIG. 6, is continuously heat sealed using a first pair 84 of upper heating bars and a first pair 86 of lower heating bars to melt continuous side portions of the first continuous web 14 of TYVEK® and continuous side portions of the second continuous web 16 flanking the longitudinal strip of slits 66. The continuous heating bars are available from Park Air of Brockton, Mass. Each of the heating bars are Watlow heaters having a separate kill switch and individually controlled by a thermostat on a control panel 87, shown in FIG. 4, operatively coupled to the respective heating bars.

FIG. 5 shows a cross-sectional lateral view of a first lateral half of the first operating station 28 having a first upper and lower heating bar 84, 86, a first upper and lower heat conductive band 70, 74, and rollers 78. It is to be understood that the second lateral half (not shown in FIG. 5) of the first operating station 28 includes corresponding upper and lower heating bars, upper and lower conductive bands 72, 76 and rollers 78.

In the preferred embodiment, the first pair of upper heating bars 84 continuously heat the target portions of the first and second continuous webs 14, 16 from above to a temperature between 300°–500° F. to perform the continuous heat sealing. The first pair of lower heating bars 86 continuously heat the target portions simultaneously from below to a temperature preferably between 100°–150° F. The lower temperature of the first lower heating bars 86 provides sufficient heat vertically through the target portions to ensure a uniform continuous heat sealed longitudinal seam.

As shown in FIG. 5, after passing the first pair of upper and lower heating bars 84, 86, the heated longitudinal target portions of the first and second continuous webs 14, 16 pass a first cooling section 88 which uses a cooling fan to cool the heat sealed seams about 15°–20° F. below the temperature imparted by the first pair of upper and lower heating bars 84, 86. The first cooling section 88 acts as a heat sink by drawing in cooler air from outside the first operating station 28 for passage through bores across and over the heated longitudinal target portions of the first and second webs 14, 16 to continuously solidify the continuous longitudinal heat sealed seams 80, 82 along the longitudinal length of the first and second continuous webs 14, 16.

Figure 7A:
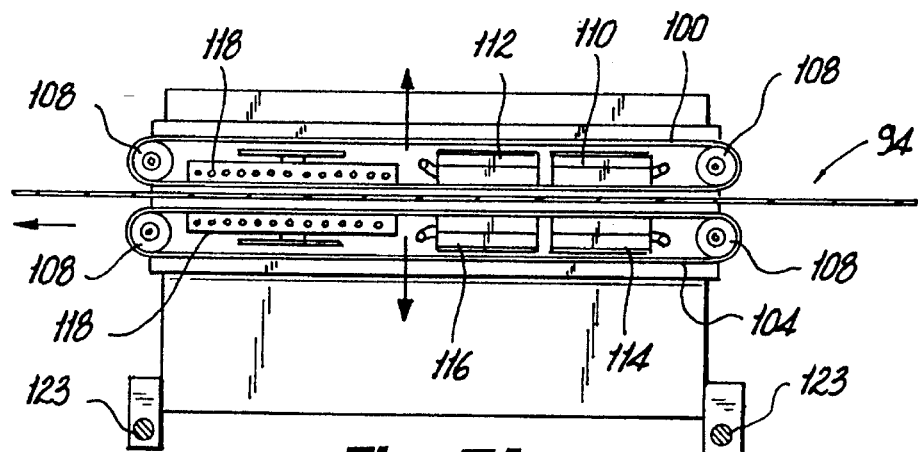
FIG. 7A is an alternative configuration of the second operating station in FIG. 7.

Prior to initialization of the apparatus 10, the first upper and lower pairs of heating bars 84, 86 with the first upper and lower pairs of heat conductive bands 70–76 on rollers 78 may be separated away from the longitudinal path of travel for the first and second continuous webs 14, 16, as shown in FIG. 5A, to manually feed the first and second continuous webs 14, 16 through the apparatus 10 prior to initialization of the continuous sealing and manufacturing process. After manual feeding of the first and second continuous webs 14, 16 and initialization of the apparatus 10, the first upper and lower pairs of heating bars 84, 86 are brought back to the position shown in FIG. 5 for continuously processing the first and second continuous webs 14, 16. The apparatus 10 has a main kill switch for shutting down the operating stations and the heating bars. Upon activation, the main kill switch also causes the heating bars and conductive bands to automatically separate from the path of travel of the continuous webs 14–18 as shown in FIGS. 5A and 7A.

In addition, the first upper and lower pair of heating bars 84, 86 and the first upper and lower pairs of heat conductive bands 70–76 slidably engage a first plurality of rails 90, 92, shown in FIG. 4, to be adjusted for transversely repositioning the first upper and lower pairs of heating bars 84, 86 and first upper and lower pairs of conductive bands 70–76 to accommodate the first and second continuous webs 14, 16 of different transverse widths and different transverse positions for the first longitudinal heat sealed seams 80, 82. It is also contemplated that other equivalent means for adjusting the positions of the heating bars and other components may be employed to attain different relative transverse positions of the continuous webs 14–18.

For example, preferably an eight inch wide first continuous web 14 of TYVEK® 1059B is continuously heat sealed to a 24 inch wide second continuous web 16 of polypropylene based polymer material with the resulting parallel longitudinally heat sealed seams 80, 82 each being approximately one fourth inch to three fourths inch wide with each spaced approximately one fourth inch from a corresponding edge of the first continuous web 14 of TYVEK® 1059B, with the first continuous web 14 of TYVEK® 1059B positioned to overlap the continuous longitudinal strip of slits 66 or apertures in the second continuous web 16 of polymer material situated between the first pair of continuous longitudinally parallel heat sealed seams 80, 82.

In the preferred embodiment, the first continuous web 14 of TYVEK® 1059B and the continuous longitudinal strip of slits 66 are positioned medially along the longitudinal girth of the second continuous web 16 of polymer material. However, it is to be understood that the position of the first continuous web 14 of TYVEK® 1059B and the continuous longitudinal strip of slits 66 in the second continuous web 16 over which the TYVEK® 1059B overlaps may be spaced at any desired distance from the edges of the second continuous web 16. Also, the first continuous longitudinally parallel heat sealed seams 80, 82 may be of any desired width, dependent upon the transverse width of the first heating bars 84, 86 and may be positioned at any desired distance from the edges of the first continuous web 14 of TYVEK® 1059B, provided that a minimum transverse width of the first continuous web 14 of the TYVEK® 1059B and at least one of the slits 66 of the longitudinal strip of slits 66 per unit of longitudinal length on the second continuous web 16 lies between the continuous parallel heat sealed seams 80, 82.

Thus, in the preferred embodiment, the apparatus 10 is capable of constructing the continuous hermetically sealed tubular structures 36 adapted for gas and steam sterilization for transverse widths of the first, second, and third continuous webs 14, 16, 18 between 5 inches and 24 inches, although larger transverse widths up to 36 inches are also contemplated.

It is also contemplated that, while preferably two continuous longitudinally parallel heat sealed seams 80, 82 are formed between the first and second continuous webs 14, 16, more than two continuous longitudinally parallel heat sealed seams 80, 82 may be formed by heat sealing according to the teachings of the present invention.

Figure 7:
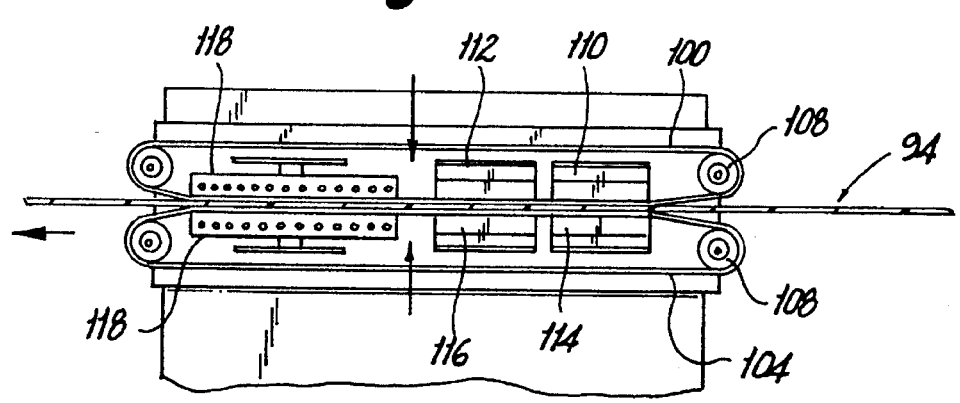
FIG. 7 is an enlarged side cross sectional view of the second operating station of the apparatus.

As shown in FIG. 6 in conjunction with FIG. 7, the first and second continuous webs 14, 16 of polymer materials joined by the first pair of continuous longitudinally parallel heat sealed seams 80, 82 are fed from the first operating station 28 simultaneously with the third continuous web 18 of polymer material fed from the feeding station 12 described above, to the second operating station 34 where the heat sealed first and second continuous webs 14, 16, as joined webs 94, are received and brought adjacent to the third continuous web 18. In the preferred embodiment, the third continuous web 18 travels through the first operating station 28 beneath the first heating section 68 and passes a third static bar 29 (shown in FIG. 1A) to remove static therefrom. In the second operating station 34, side portions 96, 98 of the second and third continuous webs 16, 18 spaced from the first continuous longitudinally parallel heat sealed seams 80, 82 are fed between second upper and lower pairs of heat sealed conductive bands 100–106 moving by rollers 108 in a configuration substantially identical in composition to the first upper and lower pairs 70–76 of heat conductive bands described above.

Referring again to FIG. 7, the side portions 96, 98 are brought together by the second upper and lower pairs 100–106 of conductive bands adjacent a second upper and lower pairs 110–116 of heating bars and a second cooling section 118 of the second operating station 34 to heat seal and to cool a second plurality of continuous parallel seams 120, 122 (shown in FIG. 8) to join the respective side portions 96, 98 of the second and third continuous webs 16, 18 to form the second pair of continuous parallel longitudinally parallel heat sealed seams 120, 122 and to cool thereafter in a manner as described above for the heat sealing and cooling of the first and second continuous webs 14, 16 in the first operating station 28. As in FIGS. 5–5A, one half of the second operating station 34 is shown in FIGS. 7–7A, and it is understood that a second half (not shown) has corresponding components. As above, it is contemplated that more than two heat sealed seams may be formed by the second operating station 34 to join the second and third continuous webs 16, 18 in a similar manner, and that rails 123 permit transverse adjustment of the components of the second operating station 34.

The second operating station 34 also permits separation of the second upper and lower heating bars 110–116 and second upper and lower conductive bands 100–106 on rollers 108, as shown in FIG. 7A, for initial manual feeding of the continuous webs 14–18 similar to the first operating stations's feature shown in FIG. 5A. As above, the second pairs of upper and lower heating bars 110–116, conductive bands, and rollers 108 are returned to the position shown in FIG. 7 after the manual feeding of the continuous webs 14–18. Similarly, activation of the main kill switch separates the components of the second operating station 34 as shown in FIG. 7A.

The resulting continuous hermetically sealed tubular structure 36, a portion of which is shown in FIG. 17, wherein the first, second, and third continuous webs 14–18 of polymer material are heat sealed by at least two pairs 80–82, 120–122, of continuous longitudinally parallel heat sealed seams as described above, has an open proximal end and an open distal end.

Figure 8:
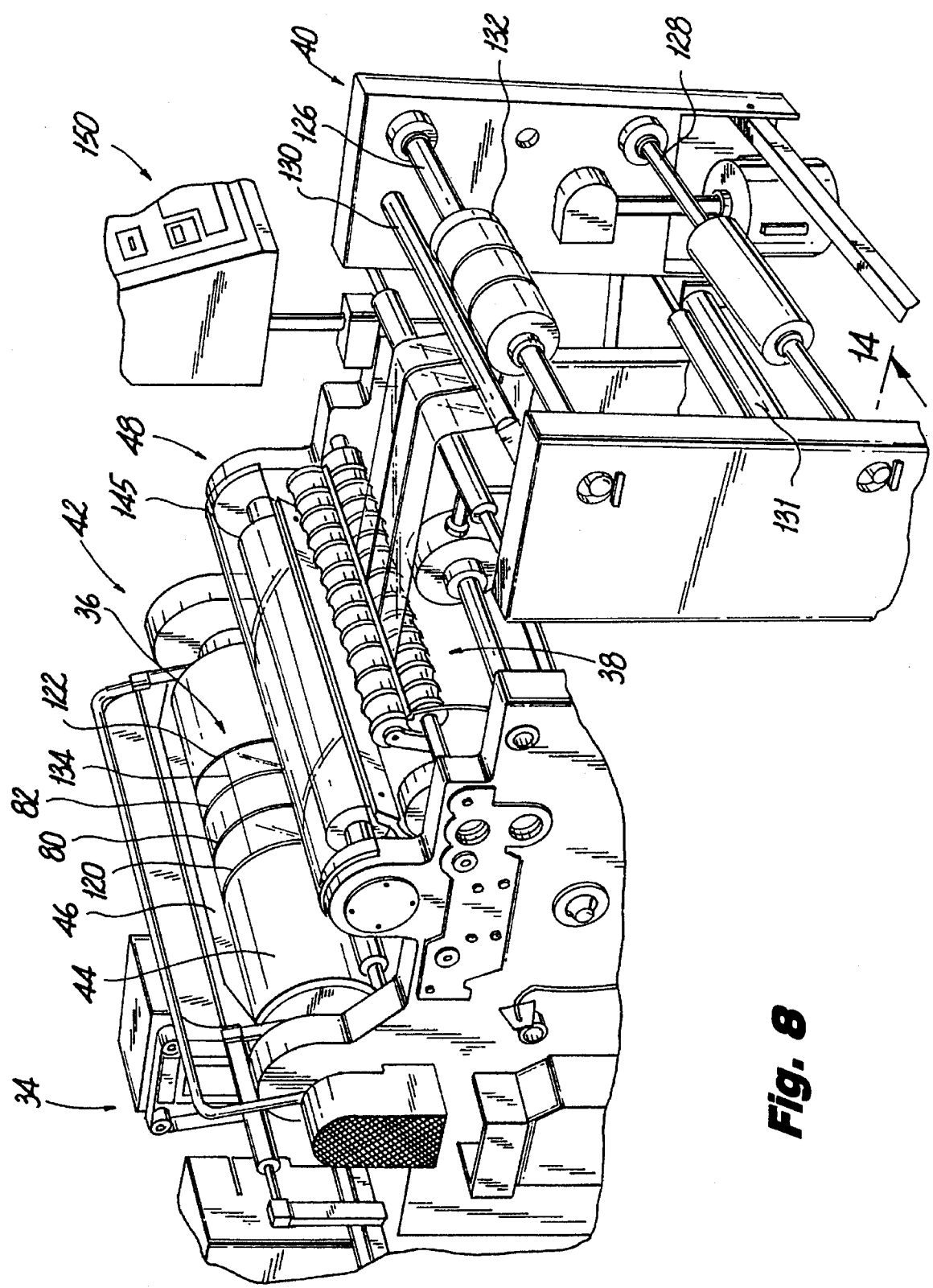
FIG. 8 is a perspective view of a third and fourth operating station and a collecting station at a distal end of the apparatus.
Figure 9:
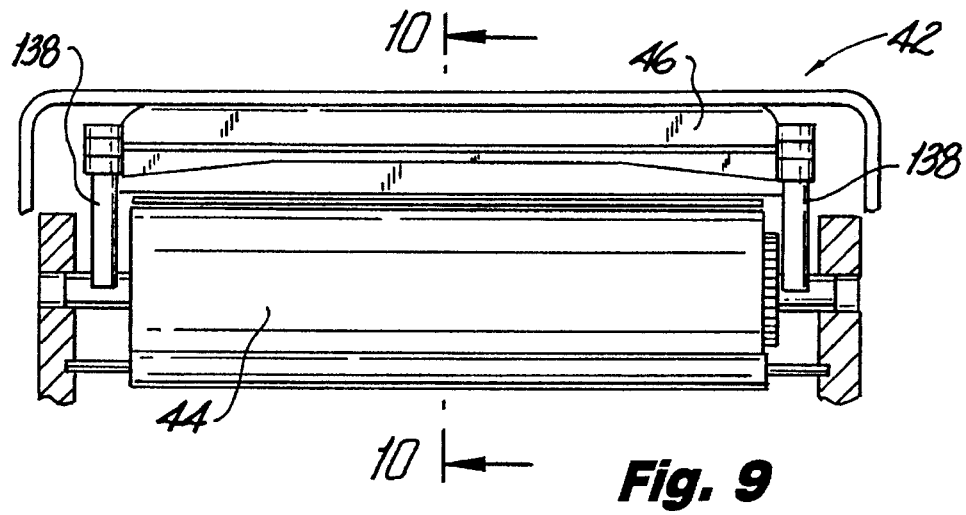
FIG. 9 is a reverse lateral view of the third operating station shown in FIG. 8.
Figure 10:
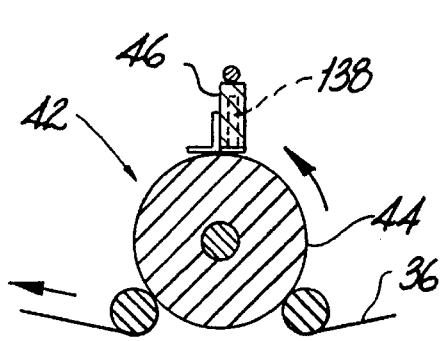
FIG. 10 is a side cross sectional view of a third operating station of FIG. 9.

Referring to FIG. 8 in conjunction with FIG. 1A, this continuous hermetically sealed tubular structure is then fed by the set of rollers 38 to the collecting station 40 or pick-up station shown in FIG. 14 for collecting the continuous hermetically sealed tubular structure 36 on clutch controlled collecting rolls 126, 128. Dancers 130, 131 are provided to maintain an even pressure and rolling as the continuous hermetically sealed tubular structure 36 is rolled evenly onto the collecting rolls 126, 128 by the clutch mechanism.

In the preferred embodiment of the collecting station 40, shown in greater detail in FIG. 14, the continuous hermetically sealed tubular structure 36 is initially fed to and collected on a first collecting roll 126 having a polyvinyl chloride (PVC) tube 132 and an adhesive substance such as masking tape or the like to hold and roll the end of the tubular structure 36. A second collecting roll 128 is optionally provided to manually transfer the continuously fed tubular structure 36 from the first collecting roll 126 to the second collecting roll 128 without stopping the apparatus 10. The tubular structure 36 collected on the first collecting roll 126 may then be removed from the collecting station 40 to collect a predetermined amount of the tubular structure 36 on each roll 126, 128 such as a specified number of feet per roll. Alternatively, a small quantity of tubular structure 36 may be removed to perform quality inspection of the tubular structure 36 as it is continuously being produced.

In an alternative embodiment, the continuous hermetically sealed tubular structure 36 may be fed from the second operating station to be received by a third operating station 42, illustrated in various views in FIGS. 8–11, which includes the transverse sealing bar 46 for heat sealing a transverse seam 134 at predetermined distances along the continuous hermetically sealed tubular structure 36. The transverse sealing bar 46 continuously operates in conjunction with a platen 44 wherein the transverse sealing bar 42 in a first position 136 is intermittently brought down onto the first, second and third continuous webs 14–18 of polymer material joined by the at least two pairs of continuous longitudinally parallel heat sealed seams 80–82, 120–122 by a plurality of pneumatic pistons 138. The transverse sealing bar 46 applies pressure and heat for a predetermined time to create the transverse heat seal as the transverse seam 134. The transverse sealing bar 46 heat seals the transverse seam 134 through the first continuous web 14 of TYVEK® 1059B and through the second and third continuous webs 16–18, including any of the slits 66 in the longitudinal strip to form the hermetically sealed transverse seam 134.

Figure 11:
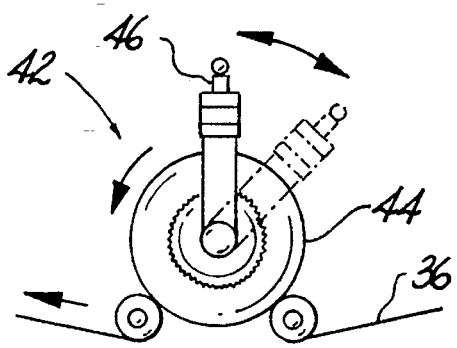
FIG. 11 is a side view of the third operating station of FIG. 9.

In addition, referring to FIG. 11, the transverse sealing bar 46 follows in a rotating motion in about a 30° to 90° circular arc to maintain its relative position on the sandwiched first, second, and third continuous webs 14–16 against the platen 44 for a predetermined period of time to apply sufficient pressure and heat to form a sufficient transverse heat sealed seam 134. The transverse sealing bar 46 then withdraws from the sealed webs 14–16 and rotates back to its first position 136. After being heat sealed by the transverse sealing bar 46, the resulting transverse heat sealed seam 134 cools about 5° F. without the need for a cooling mechanism to solidify before being fed to a fourth station 48, shown in FIGS. 8 and 12–13, for cutting the continuous hermetically sealed tubular structure 36 at a predetermined distance proximal of the transverse heat sealed seam 134.

Figure 12:
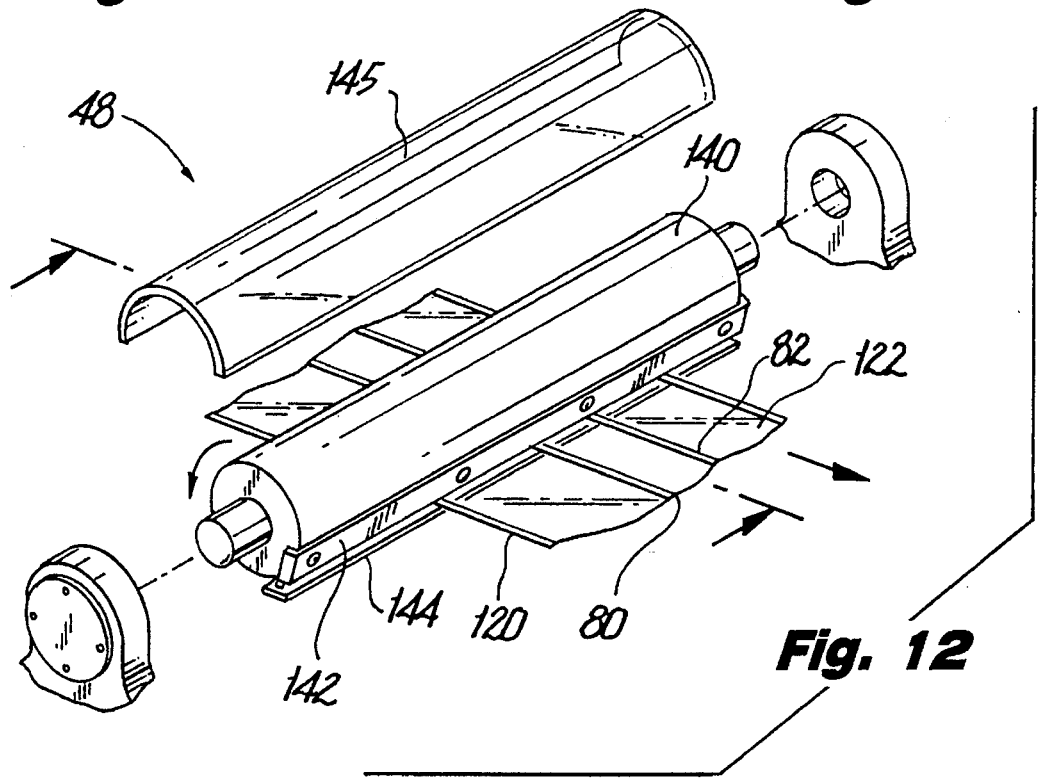
FIG. 12 is a rear exploded perspective view with parts separated of the fourth operating station of the apparatus.

Referring in greater detail to FIGS. 12–13, the fourth station 48 receives the continuous hermetically sealed tubular structure 36 with the transverse seams 134 and rotates a cutting mechanism 140 having an upper rotating blade 142 which is geared to the rotation of the platen 44 to determine the predetermined spacing proximal of the transverse heat sealed seam 134. The continuous hermetically sealed tubular structure 36 passes over the stationary blade 144 as the rotating blade 142 is rotated into the path of travel of the tubular structure 36 to shear the tubular structure 36 at the predetermined spacing from the transverse seam 134. A transparent safety cover 145 permits visual inspection of the rotation of the rotating blade 144 by an operator while preventing accidental contact therewith.

The resulting cut portions of the continuous hermetically sealed tubular structure 36 produces a number of individual bags 146, such as shown in FIG. 16, having an open end 148 and three heat sealed seams 120, 122, 134 forming closed ends, and the resulting individual bags 146 may be received on an optionally movable table or platform for collection and storage of the individual bags 146. The third operating station 42 and the fourth operating station 48 may be adjusted in conjunction with the pull dimensions of the other operating stations to apply the transverse heat sealed seam 134 and the transverse cuts after the transverse heat sealed seam 134 at any preselected length to construct individual bags 146 of any desired length to accommodate various instruments of any size desired.

In final form, each of the continuous hermetically sealed tubular structure 36 and the individually cut bags 134 are configured as shown in FIG. 18 with the web 14 of TYVEK® 1059B overlapping slits 66 and joined to the second continuous web 16 by the first plurality of longitudinal heat sealed seams, and the second and third continuous webs 16, 18 are joined by the second plurality 120, 122 of continuous heat sealed seams, with a product insertable therebetween. The open ends of both the tubular structure 36 and the individual bags 146 may then be hermetically heat sealed by a separate heat sealer prior to gas or steam sterilization of the contained product through the web 14 of TYVEK® 1059B adjacent the slits 66.

In addition, during operation of the apparatus 10, an automatic signaling mechanism is provided to signal a warning such as an audible beep to inform an operator that a predetermined quantity such as a specified number of feet per roll of continuous hermetically sealed tubular structure 36 or a specified number of inches per individual sterilizable bag 146 are accumulated.

Automatic control mechanisms are also provided to individually control each station according to the individual settings selected by an operator using various control panels; for example, the main control panel 150 shown in FIG. 15 has temperature and pressure readouts for the heating bars and conductive bands of the third operating station 42. In addition, safety mechanisms are provided. For example, if a pressure problem occurs in any of the stations, the entire apparatus 10 automatically shuts down. Also, if the apparatus 10 is manually or accidentally powered down, the heating bars and the conductive bands move away from the path of travel of the continuous webs 14–18 and every operating station then powers down.

As shown in FIG. 1 in conjunction with FIG. 15, at least one light bulb 152 on a base 154 is positioned atop the main control panel 150 to indicate the temperature of the heating bars. The brightness of the illuminated bulb is inversely proportional to the temperature of the heating bars, so a brightly lit bulb 152 indicates that the temperature is insufficient for acceptable heat sealing. Since the bulb 152 is situated to be visible from anywhere within sight distance of the apparatus 10, an operator is warned that the apparatus 10 is not ready to properly fabricate the tubular structure 146 with acceptable hermetically sealed seams, due to the initial heating up of the heating bars or due to a malfunction in the operation stations.

While the invention has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. In combination, an automated sealing apparatus for continuously heat sealing with continuous webs of polymer material to form a hermetically sealed continuous tubular structure adapted for gas sterilization and having proximal and distal ends, the combination comprising:

a first continuous web of polymer material mounted to a frame, said first continuous web being substantially pervious to sterilizing gas;

a second continuous web of polymer material mounted to the frame, said second continuous web of polymer material having a plurality of perforations therethrough positioned between first and second longitudinal edges of the second web;

a third continuous web of polymer material mounted to the frame;

means for approximating and continuously moving said continuous webs of polymer material simultaneously in a longitudinal direction;

a first operating station for continuously receiving said first and second continuous webs of polymer material and for continuously heat sealing a first plurality of continuous parallel longitudinal seams to join said first continuous web of polymer material to said second continuous web of polymer material as each of the first and second continuous webs continuously passes through the first operating station such that said perforations are sealed between said first plurality of continuous parallel longitudinal seams; and a second operating station for receiving said joined first and second continuous webs of polymer material and for continuously heat sealing a second plurality of continuous parallel longitudinal seams parallel to said first plurality of longitudinal seams to join said second and third continuous webs of polymer material as each of the second and third continuous webs continuously passes through the second operating station to form the hermetically sealed continuous tubular structure open at its proximal and distal ends.

2. The combination as in claim 1 further comprising:

means for continuously processing said second web of polymer material to provide perforations therethrough in a predetermined area adjacent a location corresponding to a sealed position of said first continuous web of polymer material.

3. The combination as in claim 1 further comprising:

a third operating station for continuously heat sealing the tubular structure transversely with respect to the longitudinal direction to generate a transverse hermetically sealed seam at predetermined seam positions along the longitudinal length of the tubular structure.

4. The combination as in claim 3 further comprising:

a fourth operating station for continuously cutting the tubular structure transversely with respect to the longitudinal direction at cutting positions spaced a predetermined distance from said predetermined seam positions to generate an individual container having an open distal end and a closed proximal end from the tubular structure.

5. The combination as in claim 1 wherein each of said first and second operating stations includes a pair of heating elements for performing the continuous heat sealing therebetween.

6. The combination as in claim 5 wherein each of said first and second operating stations includes:

at least two continuously moving heat conductive bands, each adjacent said respective pair of heating elements, to contact and transmit heat and pressure to the respective continuous webs passing through each respective operating station.

7. The combination as in claim 6 wherein said heat conductive bands include an anti-adhesion coating to prevent each respective continuous web from adhering to said heat conductive bands as each respective heating element heats each respective continuous web through each respective conductive band.

8. The combination as in claim 7 wherein the anti-adhesive coating includes polytetrafluoroethylene.

9. The combination as in claim 1 further comprising means for adjusting the position of the resulting heat sealed seams on the respective continuous webs.

10. The combination as in claim 5 wherein each of said first and second operating stations includes cooling means subsequent to the respective pair of heating elements for cooling and solidifying the continuous parallel heat sealed seams.

11. The combination as in claim 1 wherein said first plurality of heat sealed seams are substantially medial of a transverse width of said second continuous web of polymer material.

12. The combination as in claim 1 wherein:

said first continuous web of polymer material includes fibrous spun-bonded polyethylene; and said second and third continuous webs of polymer material include copolymers of polypropylene and polyethylene of sufficient amount to allow said first operating station to hermetically heat seal said first and second continuous webs.

13. Automated sealing apparatus for continuously heat sealing continuous webs of polymer material to form a hermetically sealed continuous tubular structure adapted for gas sterilization and having proximal and distal ends the automated sealing apparatus comprising:

a first continuous web of polymer material mounted to a frame, said first continuous web being substantially pervious to sterilizing gas;

a second continuous web of polymer material mounted to the frame;

a third continuous web of polymer material mounted to the frame;

means for approximating and continuously moving said continuous webs of polymer material simultaneously in a longitudinal direction;

means for continuously processing said second continuous web of polymer materials to provide perforations therethrough in a predetermined area positioned adjacent the first continuous web of polymer material;

a first operating station for continuously receiving said first and second continuous webs of polymer material and including:

a first pair of upper and lower heating elements;

a first pair of heat conductive bands, each adjacent said first pair of upper and lower heating elements, to contact and transmit heat and pressure to the respective continuous webs passing through said first operating station for continuously heat sealing a first plurality of continuous parallel longitudinal seams substantially medially of a transverse width of said second continuous web of polymer material, to join said first continuous web of polymer material to said second continuous web of polymer material as each of the first and second continuous webs continuously passes through the first operating station, said first pair of heat conductive bands including an anti-adhesion coating to prevent each respective continuous web from adhering to said first pair of heat conductive bands during the heat sealing by the first pair of upper and lower heating elements;

first cooling means subsequent to said first pair of upper and lower heating elements for cooling and solidifying the first plurality of continuous parallel heat sealed seams; and means for adjusting the position of the first pair of upper and lower heating elements relative to the longitudinal edges of said first continuous web;

a second operating station for receiving said joined first and second continuous webs of polymer material and including:

a second pair of upper and lower heating elements;

a second pair of heat conductive bands, each adjacent said second pair of upper and lower heating elements, to contact and transmit heat and pressure to the respective continuous webs passing through said second operating station for continuously heat sealing a second plurality of continuous parallel longitudinal seams parallel to said first plurality of longitudinal seams to join said second and third continuous webs of polymer material as each of the second and third continuous webs continuously passes through the second operating station to form the hermetically sealed continuous tubular structure open at its proximal and distal ends, said second pair of heat conductive bands including an anti-adhesion coating to prevent each respective continuous web from adhering to said second pair of heat conductive bands during the heat sealing by the second pair of upper and lower heating elements;

second cooling means subsequent to said second pair of upper and lower heating elements for cooling and solidifying the second plurality of continuous parallel heat sealed seams; and means for adjusting the position of the second pair of upper and lower heating elements relative to the longitudinal edges of said second and third continuous webs;

a third operating station for continuously heat sealing the tubular structure transversely with respect to the longitudinal direction to generate a transverse hermetically sealed seam at predetermined seam positions along the longitudinal length of the tubular structure; and a fourth operating station for continuously cutting the hermetically sealed continuous tubular structure transversely with respect to the longitudinal direction at cutting positions spaced a predetermined distance from said predetermined seam positions to generate an individual container having an open distal end and a closed proximal end from the tubular structure.

14. Automated sealing apparatus as in claim 13 wherein:

said first continuous web of polymer material includes TYVEK® (fibrous spun-bonded polyethylene) having a transverse width between about six inches and about eight inches;

said second and third continuous webs of polymer material include copolymers of polypropylene and polyethylene of sufficient amount to allow said first heating element to heat seal said first and second continuous webs, each of said second and third continuous webs having a transverse width between about five inches and about twenty four inches; and said first and second pairs of conductive bands include fiberglass coated with TEFLON® (polytetrafluoroethylene).

15. Automated sealing apparatus as in claim 14 wherein:

said first continuous web of polymer material is eight inch wide; and said second and third continuous webs of polymer material are twenty four inches wide.

* * * * *